United States Patent [19]

Hayden

[11] Patent Number: 5,013,175
[45] Date of Patent: May 7, 1991

[54] WINDSHIELD WIPER ANTI-ROLL CONNECTOR

[75] Inventor: William L. Hayden, Northville, Mich.

[73] Assignee: Ford Motor Company, Dearborn, Mich.

[21] Appl. No.: 419,418

[22] Filed: Oct. 10, 1989

[51] Int. Cl.$^5$ ............................................... F16D 1/00
[52] U.S. Cl. ........................................ 403/24; 403/71; 403/114; 15/250.27; 74/51
[58] Field of Search .................... 403/24, 71, 115, 114; 15/250.27, 250.31; 74/51

[56] References Cited

U.S. PATENT DOCUMENTS

| | | |
|---|---|---|
| 4,266,883 | 4/1979 | Riester et al. . |
| 4,520,689 | 10/1982 | Sucro et al. . |
| 4,550,469 | 11/1981 | Deutscher et al. . |
| 4,613,251 | 9/1986 | Bellamy et al. ................. 403/114 X |
| 4,695,180 | 9/1987 | Saito ..................................... 403/114 |
| 4,799,288 | 12/1987 | Kimizawa . |
| 4,843,898 | 7/1989 | Ishikawa ........................... 403/71 X |

Primary Examiner—Andrew V. Kundrat
Attorney, Agent, or Firm—Daniel M. Stock; Roger L. May

[57] ABSTRACT

A modified ball and socket connection is provided between links of a windshield wiper linkage system to resist rolling motion of the links with respect to the ball. A pin extends from the ball into sliding and rotating engagement with a slot formed adjacent the socket.

5 Claims, 1 Drawing Sheet

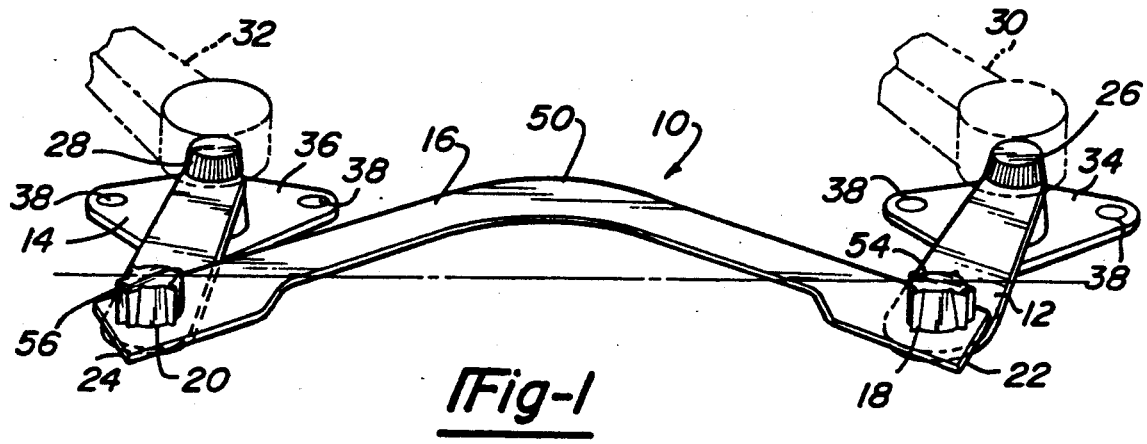
*Fig-1*
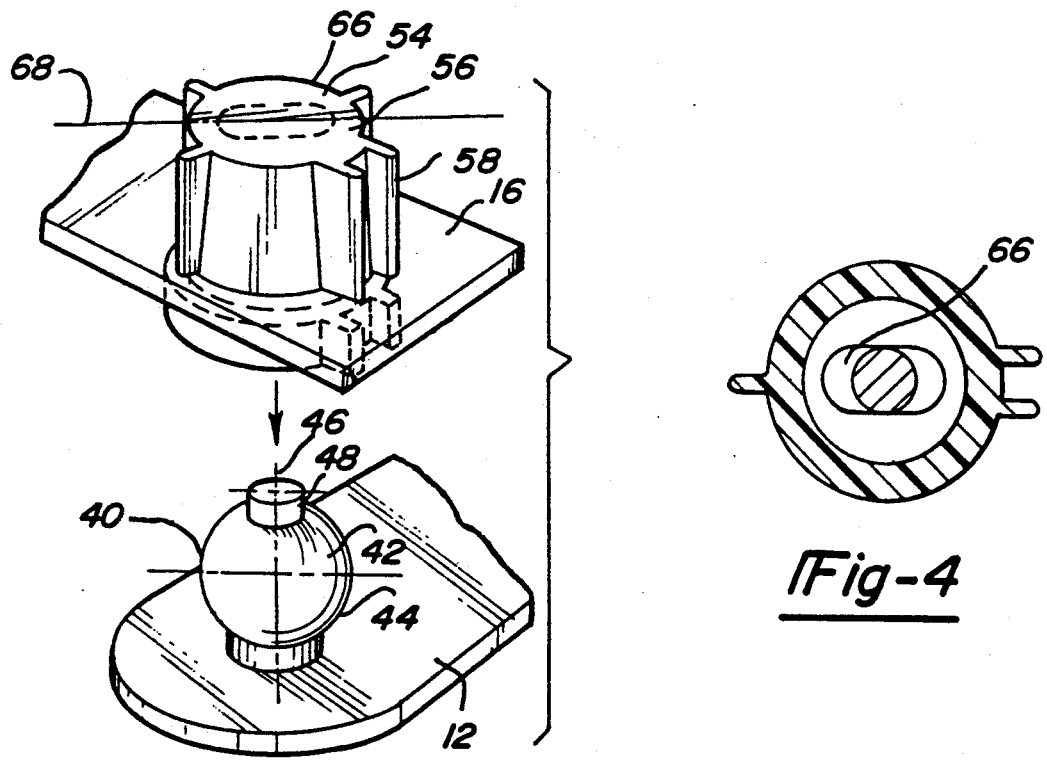
*Fig-2*
*Fig-4*
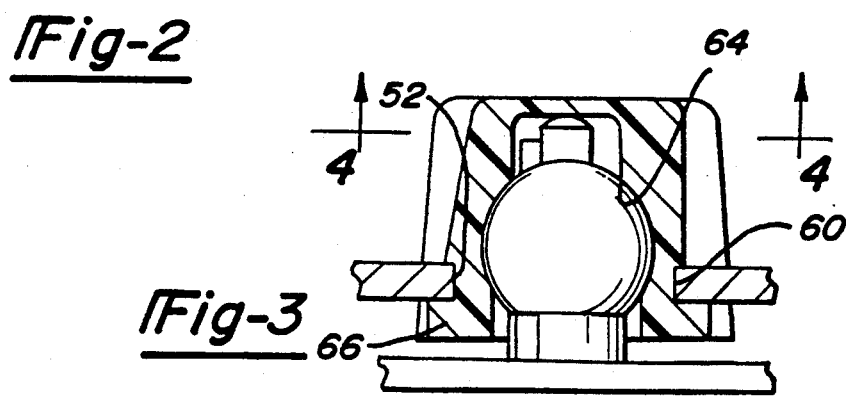
*Fig-3*

WINDSHIELD WIPER ANTI-ROLL CONNECTOR

BACKGROUND OF THE INVENTION

The present invention relates generally to automotive windshield wiper systems and more specifically to the construction of connectors for interconnecting components of the linkage of such systems.

In automotive windshield wiper systems, it is relatively conventional to provide a pair of laterally spaced, pivotally mounted crank arms mounted on the vehicle with a first one of them in direct driving relationship with a drive motor and the other connected to the first through a connecting arm extending from one crank arm to the other for following it in reciprocal movement.

Interconnecting the two pivotally mounted crank arms for timed pivotal movement with respect to one another typically involves the use of ball and socket connections between each end of the connecting arm and the corresponding crank arm. While the use of such a connection provides certain advantages in permitting multiple degrees of freedom of motion in the operation of the windshield wiper system, the pivotal freedom afforded by such connections also provides a disadvantage in certain vehicle applications. One example of such applications is that which exists when a wiper system is installed in a vehicle body in the typical fashion at the rear of the engine compartment in an area in which other vehicle components may intrude into the space separating the two pivotally mounted cranks. Such a wiper system packaging constraint necessitates the design of a connecting arm between the two pivotally mounted crank arms which is bowed or has a displaced portion for clearing the intruding component during operation. This connecting arm construction creates an inherently unbalanced condition. This unbalance can cause a rolling movement of the connecting arm about the ball and socket connections at its ends. Excessive rolling movement of the connecting arm can result in interference, noise and inefficient operation of the windshield wiper system. The normal response to such problem includes the provision of close fitting parts in adjacently spaced relationship about the ball and socket connections to limit the degree of rolling movment permitted or the provision of separate spacers and the like to stop the rolling movement of the connecting arm with respect to the crank arms. Such approaches to limiting the rolling movement have been found to be unduly complicated and uneconomical.

SUMMARY OF THE INVENTION

Responsive to the deficiencies of the prior art, it is an object of the present invention to provide a linkage system for a windshield wiper system which includes a simple and economical connection between linkage arms of the system which prevents rolling movement of one arm with respect to another.

According to a feature of the present invention, such a linkage system is provided in which the connection is simply and economically formed by the provision of a ball stud mating with a ball bushing in a fashion in which a pin extends from a portion of the ball stud into sliding engagement with a slot formed in the ball bushing to constrain rolling movement of the bushing with respect to the ball stud.

BRIEF DESCRIPTION OF THE DRAWINGS

These and other objects and features will become apparent to those skilled in the automotive windshield wiper art by reading of the following description with reference to the accompanying drawings in which FIG. 1 is a perspective view of a windshield wiper system according to the present invention;

FIG. 2 is an exploded perspective view of an improved linkage connector according to the present invention;

FIG. 3 is a longitudinal cross-sectional view of an improved linkage connector of FIG. 2; and FIG. 4 is a cross-sectional view taken along lines IV—IV of FIG. 3.

DESCRIPTION OF THE PREFERRED EMBODIMENT

Turning now to the drawings and in particular to FIG. 1, an automotive windshield wiper system is indicated generally at 10. The wiper system 10 is illustrated as including a pair of crank arms 12, 14, a connecting arm 16 spanning the crank arms 12, 14, and a pair of linkage connectors 18, 20 interconnecting the opposed ends 22, 24, respectively of the connecting arms 16 with the crank arms 12, 14, respectively.

The crank arms 12, 14 are mounted for reciprocating pivotal movement on wiper drive shafts 26, 28, respectively, which drivingly engage wiper arms 30, 32 in a known fashion. One of the wiper drive shafts 26, 28 is to be connected in a known fashion to a wiper motor or other known device for effecting its desired movement. Mounting flanges 34, 36 having mounting apertures 38 are provided for fixedly securing the windshield wiper system 10 to the body of an automotive vehicle (not shown).

It is to be understood that the wiper drive shafts 26, 28 are arranged by this mounting to effect rotary or pivotal movement about parallel axes illustrated here as being generally perpendicular to the plate-like crank arms 12, 14 of FIG. 1. At the free ends of the crank arms 12, 14, there is preferably provided a ball stud, such as this illustrated at 40 in FIG. 2, with respect to crank arm 12, it being assumed that a similar or identical stud may be provided at the end of the crank arm 14. The ball stud 40 is fixedly secured to the crank arm 12 and includes a ball portion 42 which provides a bearing surface 44. The ball stud 40 is arranged to project perpendicularly from the crank arm 12 having an axis 46 parallel to the pivotal axis of the wiper drive shaft 26. In further perpendicular projection above the crank arm 12 extending outwardly from the ball portion 42 of the ball stud 40 is a generally cylindrical pin portion 48.

The connecting arm 16 may include an offset or bowed central section 50 which creates a rolling moment about the axis intersecting the ball studs 40. The connecting arm 16 is preferably formed as a flat stamped member and includes a pair of mounting apertures as may best be seen at 52 in FIG. 3 proximate its opposed ends 22, 24. These mounting apertures 52 are sized and configured to receive a pair of ball bushings such as those indicated at 54, 56 in FIG. 1. It will be understood that the ball bushing 54 of FIG. 1, hereafter described and illustrated in FIGS. 2-4, as well as the ball stud 40 heretofore described and there illustrated, may be duplicated on both sides of the system 10 of FIG. 1, but for purposes of providing the resistance of rolling movement of the connecting arm 50, must be positioned at least at one side, such as the right side as viewed in FIG. 1, herein described and illustrated.

The ball socket 54 is illustrated as comprising a molded plastic part having a truncated conical body portion 56 from which protrudes a plurality of anti-rotation ribs 58. The aperture 52 includes slots for receiving these ribs 58 to resist rotation of the bushing 54 with respect to the connecting arm 16. A groove 60 is formed in the body 56 at the lower terminus of the ribs 58 to engage the connecting arm 16 at the aperture 52. A mounting flange portion 62 extends radially outwardly from the groove 60 to provide a mechanical stop against upward movement of the bushing 54 with respect to the arm 16 as viewed in FIGS. 2 and 3.

On the interior of the body 56 is formed a partially spherical bearing surface 64 for ball and socket engagement with the bearing surface 44 of the ball stud 40. Above the bearing surface 64 is formed an elongated slot 66 sized to receive the pin 48 of ball stud, as may best be seen in FIG. 4 for sliding movement along the axis of elongation 68 of the slot 66, as well as pivotal movement about the axis 46 of the ball stud 40. In constructing the wiper 10 of the present invention, it is contemplated that the axis of elongation 68 of the slot 66 of bushing 54 would extend between and intersect the pivotal axes of the ball studs associated with both crank arm 12 and the crank arm 14, as may best be seen in FIG. 1. This arrangement ensures that as the crank arms 12, 14 move, the obviously necessary pivotal movement about the ball studs is permitted as well as translational movement that may be necessitated by imbalances across the lateral extent of the vehicle occasioned by windshield curvature and the like, but that movement that would tend to make the connecting arm 16 roll or rotate about the axis between the ball centers is directly and positively resisted by the interaction between the pin 48 and the slot 66.

While only one embodiment of the windshield wiper system of the present invention has been disclosed, others may be possible without departing from the scope of the following claims.

I claim:

1. In a linkage system for windshield wiper systems of the type in which a pair of crank arms are each mounted in laterally spaced fashion for reciprocal movement about a pivotal axis in timed relationship to each other and a connecting arm extends between the crank arms, an improved linkage connector for attaching the connecting arm to the crank arms comprising:

a pair of ball studs each having a ball portion defining a bearing surface, one ball stud fixedly secured to each of the crank arms and each arranged to define a pivotal axis parallel to the other and to each of the pivotal axes of the crank arms.;

a pair of mounting apertures formed through opposed ends of the connecting arm.;

a pair of ball sockets mounted in each of said mounting apertures and including a bearing surface engaging said ball stud ball portion;

a pin formed on at least one of said ball studs and projecting outwardly therefrom parallel to the pivotal axis thereof; and means defining an elongated slot, an axis of elongation therealong, arranged generally normal to said ball stud pivotal axis in a corresponding number of said ball sockets and receiving a corresponding number of said pins in sliding relationship along the axis of elongation of said slot, said axis of elongation being aligned to perpendicularly intersect said ball stud pivotal axes.

2. An improved linkage connector as defined in claim 1, wherein the connecting arm includes an offset portion displaced from said slot axis of elongation.

3. An improved linkage connector as defined in claim 1, wherein said ball bushings are formed as resilient plastic molded members.

4. An improved linkage connector as defined in claim 1, wherein said ball bushings are mounted in rotatively fixed relationship in said connecting arm.

5. An improved linkage connector as defined in claim 3, wherein said ball bushings are mounted in rotatively fixed relationship in said connecting arm.

* * * * *